United States Patent
Chen et al.

(10) Patent No.: US 8,483,049 B2
(45) Date of Patent: Jul. 9, 2013

(54) SYSTEM AND METHOD FOR COMMUNICATIONS SYSTEM ROUTING COMPONENT LEVEL HIGH AVAILABILITY

(75) Inventors: Huaimo Chen, Bolton, MA (US); Qianglin Quintin Zhao, Boxborough, MA (US)

(73) Assignee: FutureWei Technologies, Inc., Plano, TX (US)

( * ) Notice: Subject to any disclaimer, the term of this patent is extended or adjusted under 35 U.S.C. 154(b) by 371 days.

(21) Appl. No.: 12/829,315

(22) Filed: Jul. 1, 2010

(65) Prior Publication Data

US 2011/0235503 A1    Sep. 29, 2011

Related U.S. Application Data

(60) Provisional application No. 61/318,459, filed on Mar. 29, 2010.

(51) Int. Cl.
*H04L 1/00* (2006.01)
*G06F 11/16* (2006.01)

(52) U.S. Cl.
USPC .................. 370/219; 370/220; 714/13

(58) Field of Classification Search
None
See application file for complete search history.

(56) References Cited

U.S. PATENT DOCUMENTS

| | | | |
|---|---|---|---|
| 7,406,035 B2 * | 7/2008 | Harvey et al. | 370/218 |
| 7,535,827 B2 * | 5/2009 | Rusmisel et al. | 370/219 |
| 7,539,744 B2 * | 5/2009 | Matthews et al. | 709/223 |
| 8,051,326 B2 * | 11/2011 | Chen | 714/13 |
| 8,082,391 B2 * | 12/2011 | Brown et al. | 711/114 |
| 2002/0167952 A1 * | 11/2002 | Watson et al. | 370/401 |
| 2003/0056138 A1 | 3/2003 | Ren | |
| 2003/0218982 A1 * | 11/2003 | Folkes et al. | 370/238 |
| 2004/0008700 A1 * | 1/2004 | Visser et al. | 370/401 |
| 2008/0159325 A1 * | 7/2008 | Chen et al. | 370/432 |
| 2008/0320188 A1 * | 12/2008 | Luo et al. | 710/104 |
| 2009/0116514 A1 | 5/2009 | Yan et al. | |
| 2009/0129261 A1 * | 5/2009 | Visser et al. | 370/219 |
| 2009/0310483 A1 | 12/2009 | Okazaki | |
| 2011/0038255 A1 * | 2/2011 | Zhou et al. | 370/218 |

FOREIGN PATENT DOCUMENTS

| | | |
|---|---|---|
| CN | 1610898 A | 4/2005 |
| CN | 1976313 A | 6/2007 |
| CN | 101425961 A | 5/2009 |
| CN | 101573940 A | 11/2009 |

OTHER PUBLICATIONS

International Search Report and Written Opinion received in Patent Cooperation Treaty Application No. PCT/CN2011/072252, dated Jun. 2, 2011, 11 pages.

* cited by examiner

*Primary Examiner* — Min Jung
(74) *Attorney, Agent, or Firm* — Slater-Matsil, L.L.P.

(57) ABSTRACT

A system and method for communications system routing component level high availability are provided. A method for providing routing component level high availability includes synchronizing information from an active information source, detecting a failure in a routing component, replacing the failed routing component with a backup routing component, and completing synchronization of the information.

19 Claims, 6 Drawing Sheets

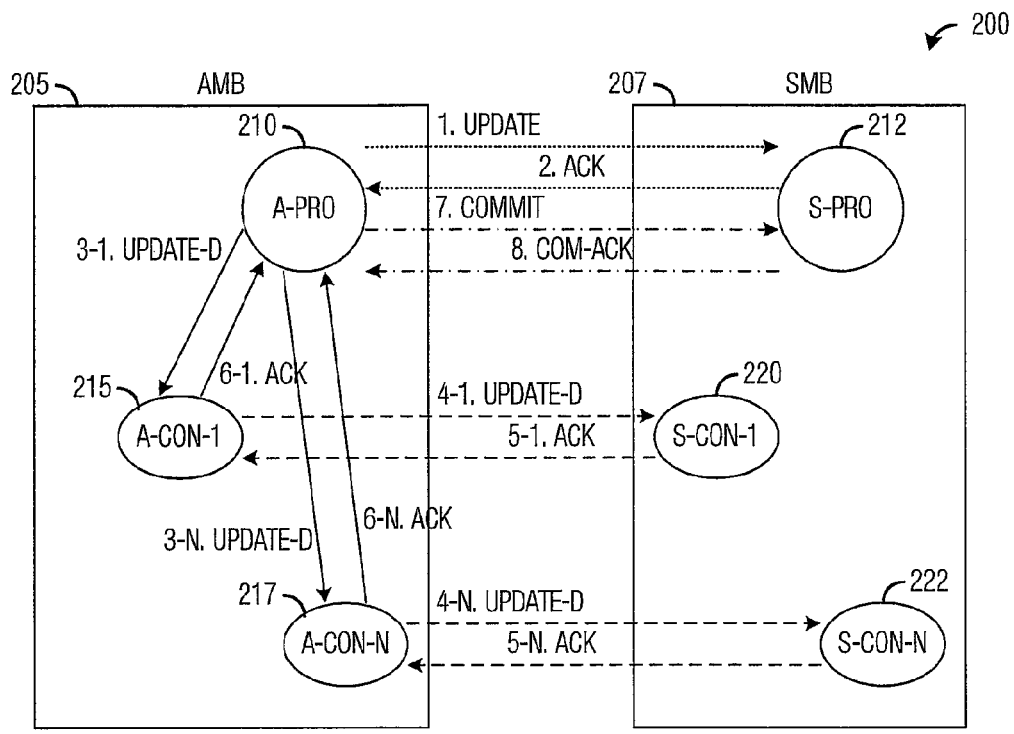
*Fig. 2a*
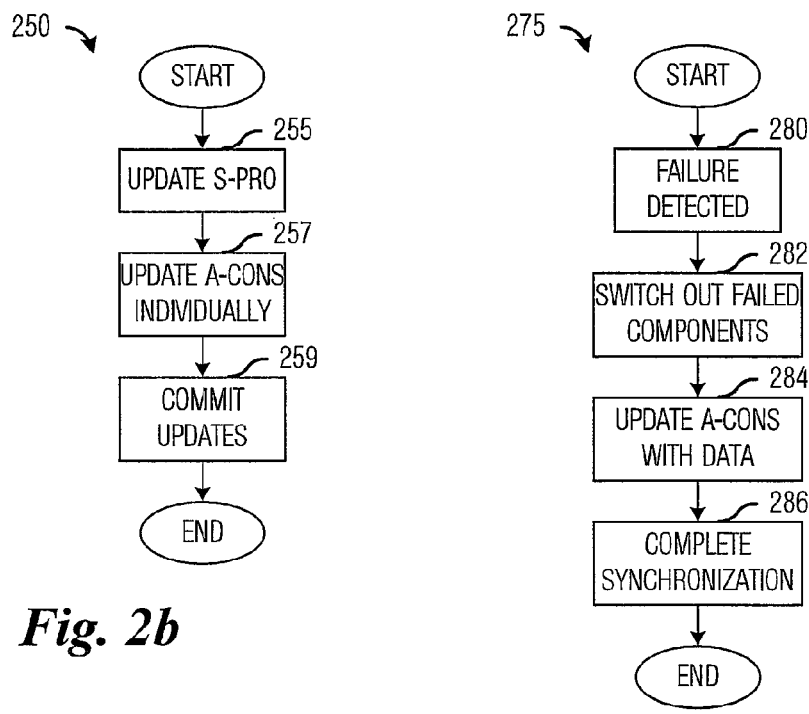
*Fig. 2b*
*Fig. 2c*

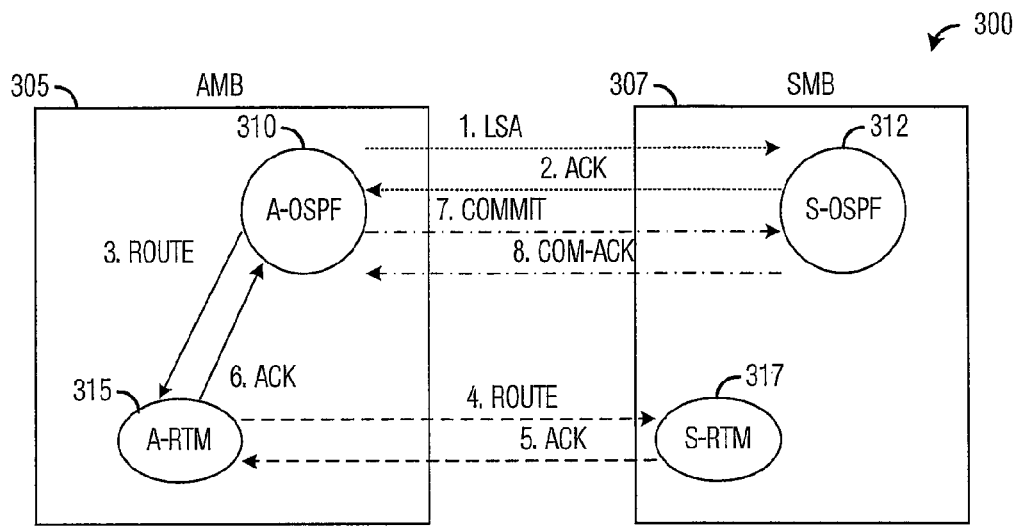
*Fig. 3a*
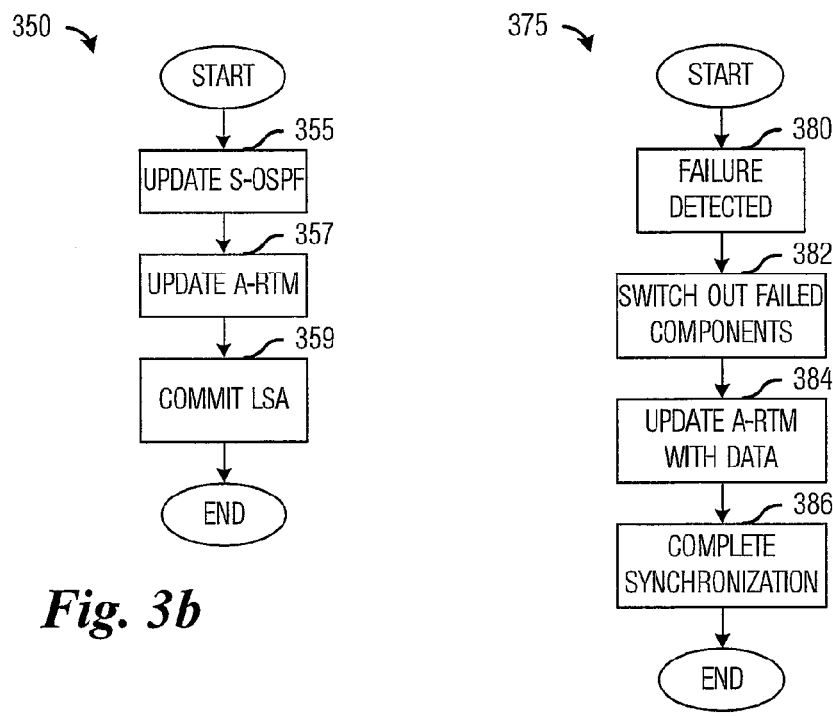
*Fig. 3b*
*Fig. 3c*

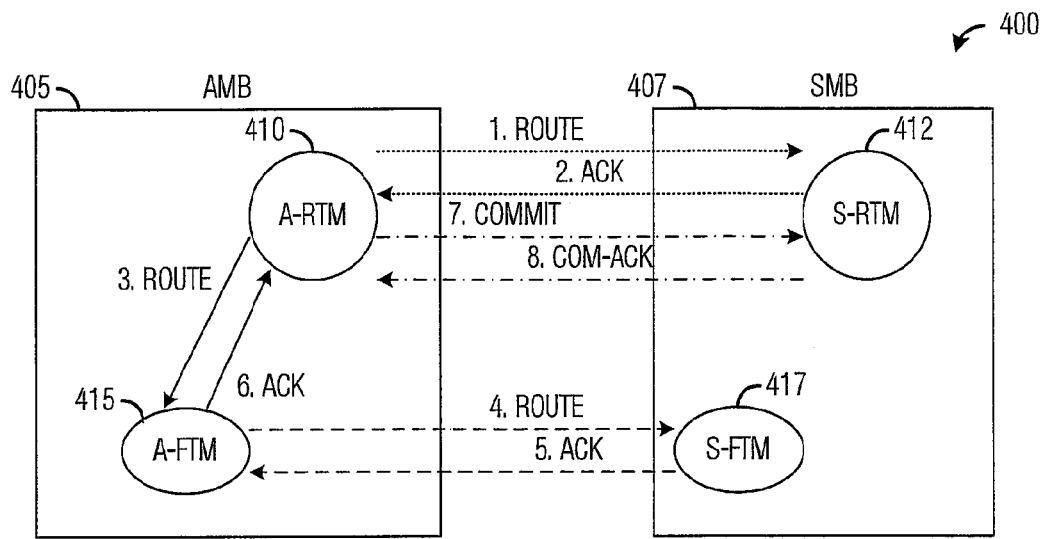
*Fig. 4a*
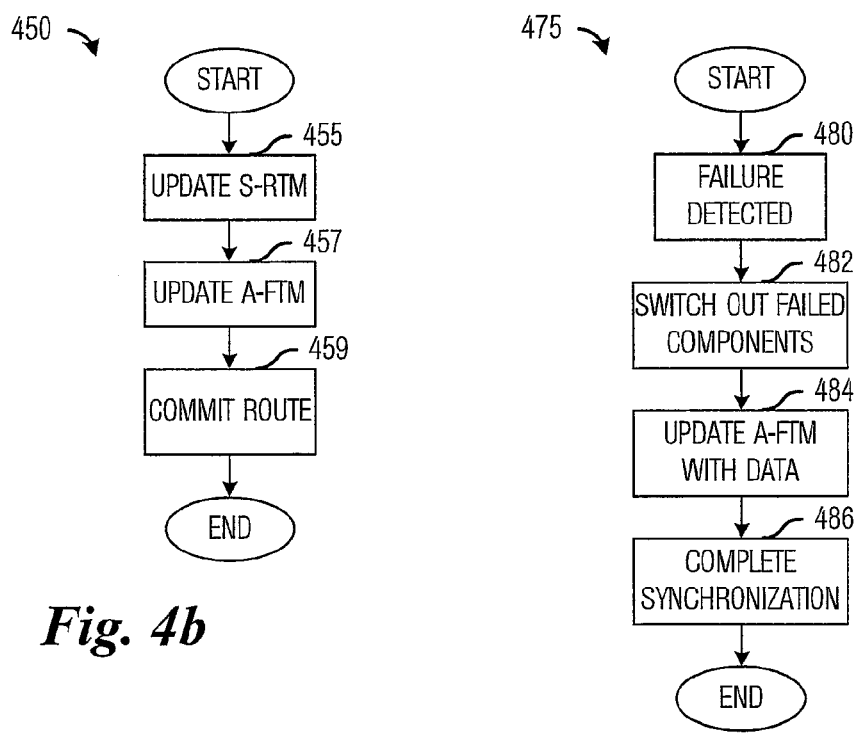
*Fig. 4b*
*Fig. 4c*

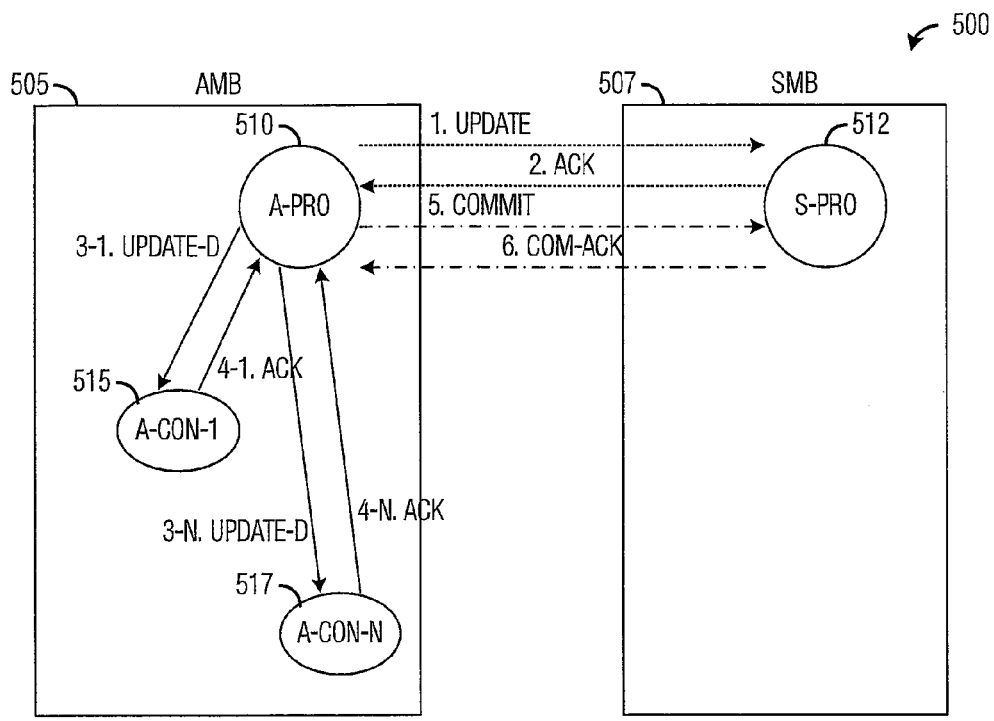
*Fig. 5a*
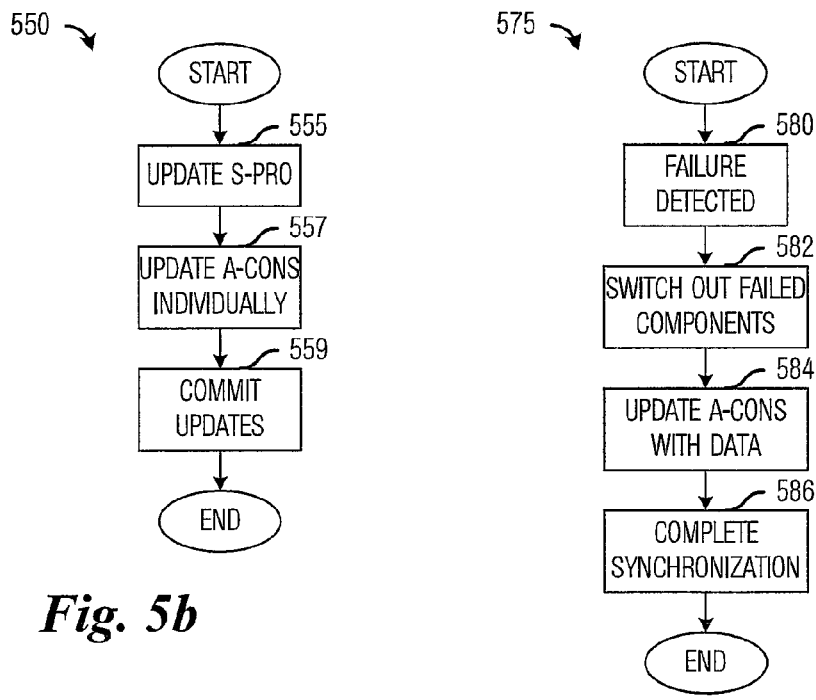
*Fig. 5b*
*Fig. 5c*

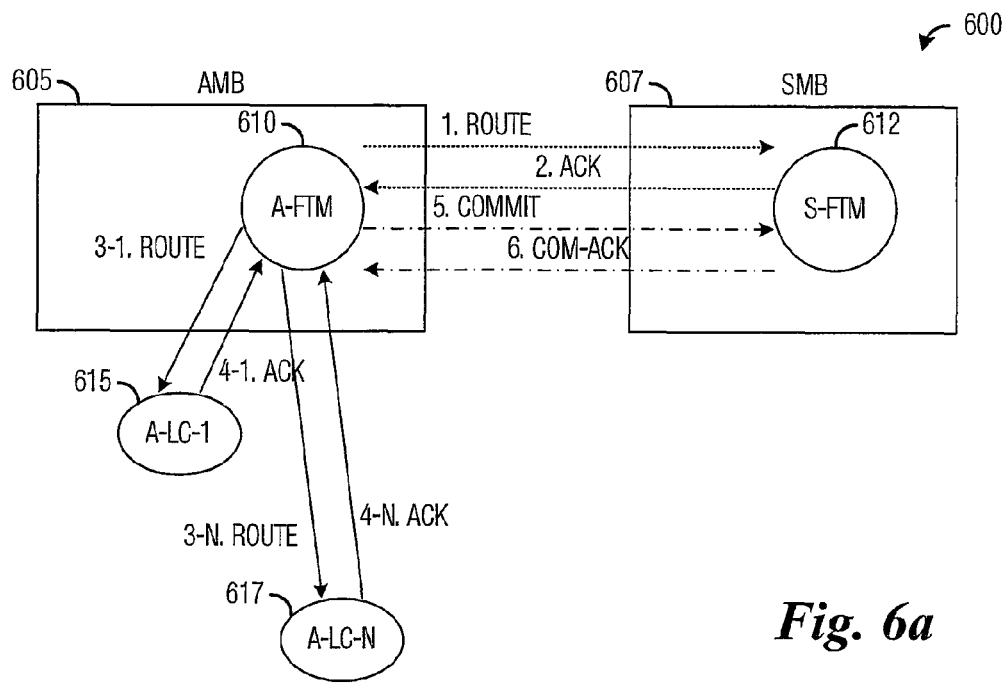
*Fig. 6a*
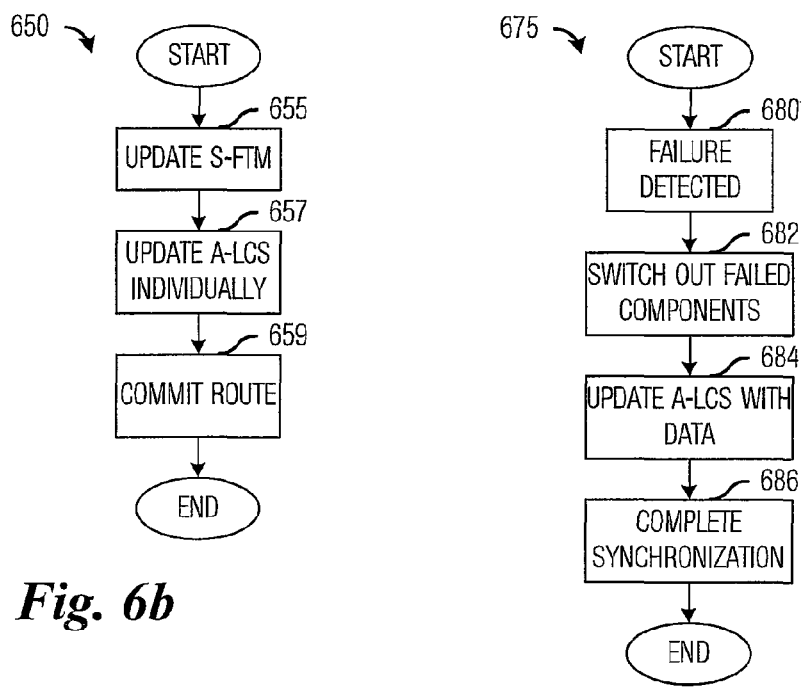
*Fig. 6b*
*Fig. 6c*

SYSTEM AND METHOD FOR COMMUNICATIONS SYSTEM ROUTING COMPONENT LEVEL HIGH AVAILABILITY

This application claims the benefit of U.S. Provisional Application. No. 61/318,459, filed on Mar. 29, 2010, entitled "System and Method for Routing Component Level High Availability," which application is hereby incorporated herein by reference.

TECHNICAL FIELD

The present invention relates generally to a system and method for digital communications, and more particularly to a system and method for communications system routing component level high availability.

BACKGROUND

Many service providers have started to provide real-time network services, such as Voice over Internet Protocol (VoIP), Internet Protocol (IP) television, and so forth, to their customers through the providers' communications systems. Due to the real-time nature of these services, it may be very critical for the service providers to provide continuous services at a satisfactory level to their customers. Hence, the service providers need to keep their network services always available for their customers.

A router is a major building block in a communications system that provides real time network services to customers. There are a number of routing protocols, such as Open Shortest Path First (OSPF) and Border Gateway Protocol (BGP), running in a router. These protocols maintain the latest network topology and calculate the optimal routes to each destination in the communications system. A Routing Table Manager (RTM) in the router maintains all the routes calculated by each routing protocol in a routing table and selects the routes with higher preference to each destination. All these selected routes are stored by a Forwarding Table Manager (FTM) in a Forwarding Information Base (FIB) for forwarding packets.

Generally, each router in a communications system has a consistent view of the topology of the communications system with any other router in the communications system by executing routing protocols to exchange the information about the communications system with its adjacent routers. Thus each router has a consistent FIB with any other router in the communications system and properly forwards packets towards to their destinations. If there is any inconsistency in the FIB or the view of the topology of the communications system, a routing loop(s) may occur and real-time network services may get interrupted.

A common router with high availability consists of an Active Main Board (AMB) and a Standby Main Board (SMB). A RTM and routing protocols, such as OSPF and BGP, run on both the AMB and the SMB. In some routers, different software components, such as the RTM and the BGP, may run as separated processes. A critical problem that may happen in the communications system is that it may take a long time for a router to recover from a failure in the router through techniques, such as failed component switchover, since a synchronization of a large amount of data between some processes, for example, millions of BGP routes in the routing table between the RTM and the BGP, may take a long time. During the recovery, the router may have inconsistent FIB or the view of the topology of the communications system with respect to other routers in the network. The inconsistency may cause routing loop(s), as well as real-time network service degradation or interruption.

Therefore, there is a need of a system and method for quick recovery from a failure in a router. Thus the router with the failure will instantly (or very shortly) have a consistent FIB and view of the communications system with other routers in the network after performing a failed component switchover. Real-time network services provided by the communications system will not be significantly affected by the failure within the router.

SUMMARY OF THE INVENTION

These and other problems are generally solved or circumvented, and technical advantages are generally achieved, by preferred embodiments of the present invention which provides a system and method for communications system routing component level high availability.

In accordance with a preferred embodiment of the present invention, a method for synchronizing information from an active information source is provided. The method includes detecting a change in information, sending a first update regarding the changed information to a backup information source, sending a second update to each of one or more active information consumers, and committing the changed information with the backup information source. The second update is derived from the changed information.

In accordance with another preferred embodiment of the present invention, a method for providing routing component level high availability is provided. The method includes synchronizing information from an active information source, detecting a failed routing component, replacing the failed routing component with a backup routing component, and completing synchronization of the information.

In accordance with another preferred embodiment of the present invention, a router is provided. The router includes a receiver to be coupled to a data input port, a transmitter to be coupled to a data output port, an active main board coupled to the transmitter and to the receiver, a standby main board coupled to the active main board, and a controller coupled to the active main board and to the standby main board. The receiver receives incoming information with the data input port, the transmitter transmits outgoing information with the data output port, the active main board provides routing management and executes routing protocols to route incoming information to its intended recipient, and the standby main board provides redundancy for the active main board in case of a failure in the active main board. The controller detects faults in the active main board, and switches failed components with standby components when a fault is detected.

An advantage of an embodiment is that an amount of data that must be exchanged to synchronize relevant routing information among various related routing components when a failure in a routing component is detected and the failed routing component is replaced is significantly reduced. Therefore, synchronizing relevant routing information takes substantially less time, reducing negative impact on real-time services.

A further advantage of an embodiment is that a wide variety of routing components may be replaced, thereby increasing a flexibility in providing multiple routing components high availability.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2a is a diagram of a portion of a router;

FIG. 2b is a flow diagram of A-PRO operations in information synchronization;

FIG. 2c is a flow diagram of operations in switching out a failed component with a new component and bringing the new component into service;

FIG. 3a is a diagram of a portion of a router related to A-OSPF;

FIG. 3b is a flow diagram of A-OSPF operations in LSA and route synchronization;

FIG. 3c is a flow diagram of operations in switching out a failed A-OSPF component with a new component and bringing the new component into service;

FIG. 4a is a diagram of a portion of a router related to A-RTM;

FIG. 4b is a flow diagram of A-RTM operations in route synchronization;

FIG. 4c is a flow diagram of operations in switching out a failed A-RTM component with a new component and bringing the new component into service;

FIG. 5a is a diagram of another portion of a router;

FIG. 5b is a flow diagram of A-PRO operations in information synchronization;

FIG. 5c is a flow diagram of operations in switching out a failed A-PRO component with a new component and bringing the new component into service;

FIG. 6a is a diagram of a portion of a router related to A-FTM;

FIG. 6b is a flow diagram of A-FTM operations in route synchronization; and

FIG. 6c is a flow diagram of operations in switching out a failed A-FTM component with a new component and bringing the new component into service.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a router in a communications system that provides real-time services. The invention may also be applied, however, to routers in other communications that provide real-time, near real-time, time sensitive, time insensitive, or a combination thereof, services.

Figure 1A:
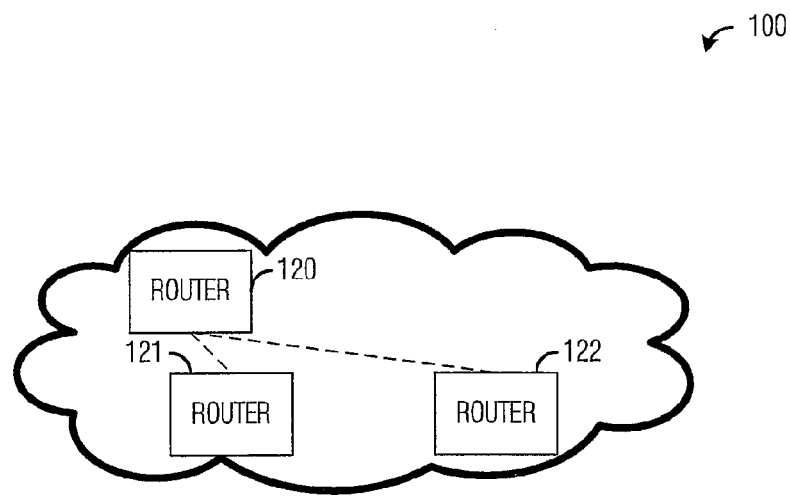
FIG. 1a is a diagram of a communications system.

FIG. 1a illustrates a communications system 100. Communications system 100 may include one or more routers, such as router 120, router 121, and router 122. A router may connect to one or more other routers. For example, router 120 may be connected to router 121 and router 122.

In general, each router has the information about the network topology for a communications system. Each router computes the best routes to a destination based on the information about the network topology. The best routes may be written into a routing table, from which the best routes are transferred to the forwarding table, which is used to forward data such as IP packets to its destination.

Figure 1B:
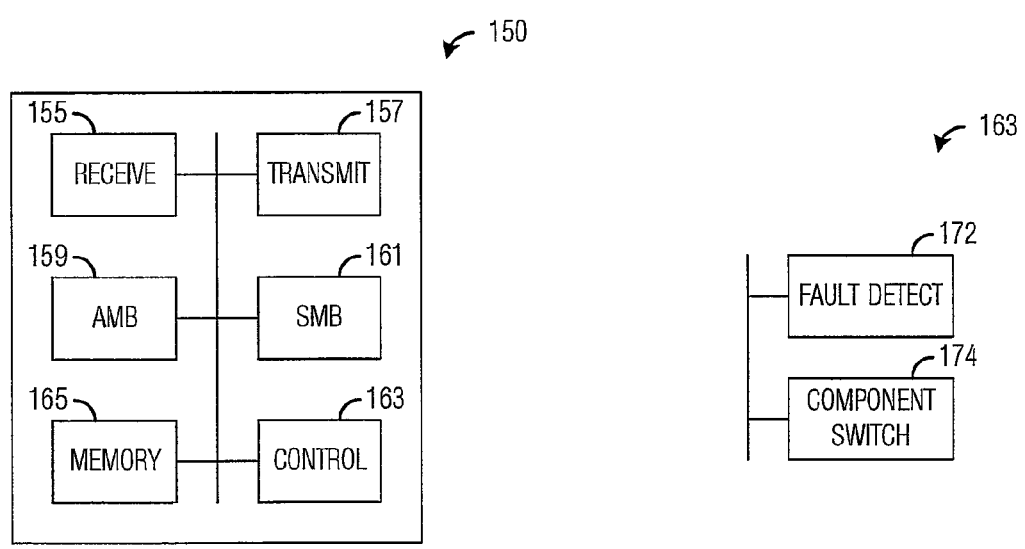
FIG. 1b is a diagram of a router.

FIG. 1b illustrates a router 150. Router 150 may be an implementation of a router used in a communications system, such as communications system 100. Router 150 may be a wireline router, a wireless router, or a combination thereof. The discussions herein do not distinguish between wireline or wireless routers. Hence, the use of the term router may apply to either a wireline router, a wireless router, or a combination wireline and wireless router.

Router 150 includes a receive unit 155 that may be used to receive incoming information, generally, in the form of IP packets. Router 150 also includes a transmit unit 157 that may be used to transmit outgoing information. Receive unit 155 and transmit unit 157 may be coupled to an active main board (AMB) 159. AMB 159 may consist of units that perform routing tasks, such as routing table management, execute routing protocols, and so forth, that may be used to route the received incoming information to its intended recipient.

As an example, AMB 159 may be implemented with a processing element, such as a general purpose processor, an application specific processor, a controller, a signal processing unit, or so forth. In an alternative embodiment, AMB 159 may be implemented with functional blocks specifically designed to provide routing functionality, such as routing table management, execute routing protocols, and so forth. AMB 159 may also include dedicated memory to store information, such as routes, and so on.

In order to increase availability, i.e., reliability, router 150 may include more than one main board. As shown in FIG. 1b, router 150 also includes a standby main board (SMB) 161 that may be substantially similar to AMB 159. According to an embodiment, AMB 159 and SMB 161 may be identical, meaning that SMB 161 may provide the same functionality as AMB 159. SMB 161 may provide a measure of redundancy to router 150. According to an alternative embodiment, SMB 161 may implement a subset of the functionality of AMB 159, providing only some of the functionality of AMB 159. For example, AMB 159 may include active information consumers not implemented in SMB 161.

Router 150 also includes a control 163 that may be used to control the operation of router 150, such as detecting faults, switching components (e.g., switching a failed component for one that is operating properly), and so forth. Control 163 may be implemented using a general purpose or special purpose processor or controller, combinatorial logic, state machines, or a combination thereof. A memory 165 may be used to store configuration information, provide storage space for routing data, scratch memory, buffer space, and so on. Memory 165 may be a combination of read-only memory, random access memory, programmable read-only memory, and so on.

Figure 1C:
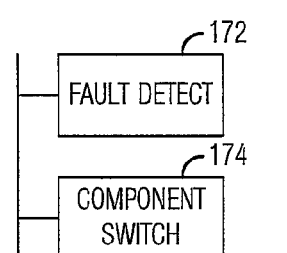
FIG. 1c is a diagram of a detailed view of a control shown in FIG. 1b.

FIG. 1c illustrates a detailed view of control 163. Control 163 includes a fault detect unit 172 for use in detecting failures in AMB 159, and a component switch unit 174 for use in switching failed components with standby components.

Fault detect unit 172 may detect a failure in a component of AMB 159. According to an alternative embodiment, instead of detecting a failure of a single component of AMB 159, fault detect unit 172 may detect that AMB 159 in its entirety has become faulty. Detecting a failure may be performed using a variety of techniques. For example, if a component does not respond after a specified amount of time, the component may be deemed a failed component. Alternatively, if a component does not respond to specific requests, the component may be deemed a failed component. Furthermore, a component may be deemed a failed component if it is not operating within specified parameters. Detecting a failed component may be beyond the scope of the embodiments and will not be discussed further herein.

Component switch unit 174 may be used to switch a faulty component with a standby component. For example, if a particular component is detected as being faulty, then component switch unit 174 may perform operations, such as signal path re-routing, flag setting, and so forth, which may be necessary to replace the faulty component with the standby component. Component switch unit may switch out only the faulty component, all components of the same type as the faulty component, or a board containing the faulty component in its entirety.

FIG. 2a illustrates a portion of a router 200. An AMB 205 and a SMB 207 of router 200 are highlighted in FIG. 2a. Recovery from a failed component and a technique for data synchronization between AMB 205 and SMB 207 are shown in FIG. 2a.

In AMB 205, there may be an active producer (A-PRO) 210 executing, while in SMB 207, a standby producer (S-PRO) 212 may be executing. Furthermore, there may be multiple active consumers (A-CON), such as A-CON-1 215 and A-CON-N 217, executing in AMB 205, as well as multiple standby consumers (S-CON), such as S-CON-1 220 and S-CON-N 222, executing in SMB 207.

A-PRO 210 may be considered to be an active information source in that it is producing information for consumption by active information consumers, e.g., the A-CONs. S-PRO 212 may be considered to be a backup information source since it is intended to be a replacement for A-PRO 210 in case A-PRO 210 fails. Similarly, the S-CONs may be considered to be backup information consumers, backing up the A-CONs should one or more of the A-CONs fail.

A-PRO 210 may communicate with S-PRO 212 as well as the A-CONs, while each A-CON may communicate with A-PRO 210 and its corresponding S-CON. For example, A-CON-1 215 may communicate with A-PRO 210 and S-CON-1 220. S-PRO 212 may communicate with A-PRO 210, and each S-CON may communicate with its corresponding A-CON. As an example, S-CON-N 222 may communicate with A-CON-N 217.

Also illustrated in FIG. 2a is a sequence of transmissions between components of AMB 205 and SMB 207 to synchronize information. Synchronizing information may begin with A-PRO 210 sending an update to S-PRO 212 (shown as event 1 "UPDATE") when A-PRO 210 finds that there has been an information change. According to an embodiment, an information change may include a new piece of information, a modification to an existing piece of information, a deletion to an existing piece of information, or a combination thereof. The update contains the information change.

S-PRO 212, upon successful receipt of the update, may send an acknowledgement for the update back to A-PRO 210 (shown as event 2 "ACK") after S-PRO 212 processes the update. Processing the update may include checking the update, decoding the update, storing information from the decoded update, and so forth. A-PRO 210 may also send an update-d derived from the information change to the A-CONs, such as A-CON-1 215 and A-CON-N 217, after receiving the acknowledgement from S-PRO 212 (shown as events 3-1 "UPDATE-D" and 3-N "UPDATE-D"). According to an embodiment, the update-d that is derived from the information change may contain the information change in one case and may contain the information that is generated by the information change and existing information in another case. According to another embodiment, A-PRO 210 may either send the update-d to the A-CONs concurrently or sequentially.

After receiving the update-d from A-PRO 210 and processing the update, each of the A-CONs may send an update-d to its corresponding S-CONs, for example, A-CON-1 215 may send an update-d to S-CON-1 220, and so on (shown as events 4-1 "UPDATE-D" and 4-N "UPDATE-D"). Each of the S-CONs, after receiving the update-d from its corresponding A-CON and processing the update-d, may send an acknowledgment for the update-d to its corresponding A-CON (shown as events 5-1 "ACK" and 5-N "ACK"). As an example, S-CON-N 222 may send an acknowledgement to A-CON-N 217.

For each update (or discrete unit of information), there are flags to indicate update states in S-PRO 212. One state of the update may be "Received from A-PRO" indicating that S-PRO 212 receives the update from A-PRO 210. The flag for the update is set to "Received from A-PRO" by S-PRO 212 after S-PRO 212 received and processed the update. Another state of the update may be "Stored in S-CON" indicating that each of the S-CONs received and stored the update-d that is derived from the information change contained in the update.

Upon receipt of an acknowledgement from its corresponding S-CON, each A-CON may send an acknowledgement for the update-d from A-PRO 210 back to A-PRO 210 (shown as events 6-1 "ACK" and 6-N "ACK"). After receiving acknowledgements from all of its A-CONs, A-PRO 210 may send an update commit to S-PRO 212 (shown as event 7 "COMMIT"). According to an embodiment, the update commit may be an indication to S-PRO 212 that all the S-CONs received and stored the update-d that is derived from the information change contained in the update. Effectively, the commit informs S-PRO 212 to set the flag to "Stored in S-CON". S-PRO 212 may then send a commit acknowledgement to A-PRO 210 after it processes the update commit (shown as event 8 "COM-ACK").

FIG. 2b illustrates a flow diagram of A-PRO operations 250 in information synchronization. A-PRO operations 250 may be indicative of operations occurring in an A-PRO, such as A-PRO 210, as the A-PRO synchronizes information with S-PROs, A-CONs, and S-CONs when the A-PRO detects an information change. A-PRO operations 250 shown in FIG. 2b may be a summary of events shown in FIG. 2a from the A-PRO's perspective and with acknowledgements not shown.

A-PRO operations 250 may begin with the A-PRO detecting an information change and, as a result of the detected information change, updating the S-PRO (block 255). In addition to updating the S-PRO, the A-PRO may also update the A-CONs (block 257). After updating both the S-PRO and the A-CONs, the A-PRO may commit the information change with the S-PRO (block 259). A-PRO operations 250 may then terminate.

FIG. 2c illustrates a flow diagram of operations 275 in switching out a failed component with a new component and bringing the new component into service. Operations 275 may be indicative of operations occurring in a control, such as control 163, of a router when the router detects a failed component and uses component switching to replace the failed component with a new component.

Component switching may occur at different granularities. For example, at a fine granularity, component switching may replace only the failed component with a new component. At a medium granularity, component switching may replace the failed component along with components of the same type (same component type) as the failed component with new components. While at a high granularity, component switching may replace an entire board containing the failed component with a new board. Operations 275 may be illustrative of operations occurring at any granularity level.

Operations 275 may begin with the router detecting a failure (block 280). Detecting a failure may be performed using a variety of techniques. After detecting a failed component or failed components, the failed component may be switched out with new components (block 282). The components being switched out may depend on the granularity of the component switching. For example, if an A-PRO fails, the failed A-PRO may be replaced with an S-PRO or an entire board containing the failed A-PRO, i.e., an AMB, may be replaced with a SMB. Similarly, if an A-CON fails, the failed A-CON may be replaced by an S-CON, all A-CONs (including the failed A-CON) may be replaced by S-CONs, a board containing the failed A-CON may be replaced, or so on.

For discussion purposes, consider three exemplary cases: 1) AMB 205 is detected to have failed, then AMB 205 may be replaced by SMB 207, with A-PRO 210 and A-CON-1 215 through A-CON-N 217 of AMB 205 being replaced by S-PRO 212 and S-CON-1 220 through S-CON-N 222 of SMB 207. S-PRO 212 and S-CON-1 220 through S-CON-N 222 of SMB 207 now become A-PRO and A-CONs. 2) A-PRO 210 is detected to have failed, then A-PRO 210 may be replaced by S-PRO 212, with S-PRO 212 becoming an A-PRO. 3) A-CON-1 215 is detected to have failed, then all A-CONs (A-CON-1 215 through A-CON-N 217) may be replaced by S-CONs (S-CON-1 220 through S-CON-N 222), with the S-CONs becoming A-CONs.

After the failed component(s) have been switched with new component(s) (block 282), the A-PRO (either an original A-PRO or a new A-PRO) may send all data having state "Received from A-PRO" stored in the A-PRO's memory, cache, tables, and so forth, to the A-CONs (block 284). Since the amount of data having state "Received from A-PRO" is typically small, sending the data to the A-CONs may be performed very quickly.

If the failed component(s) is an A-CON, then information synchronization may proceed as normal (e.g., as described in FIGS. 2a and 2b). The synchronization completes (block 286), the router may resume normal operations and operations 275 may then terminate.

Although not shown, information synchronization of A-PRO 210, S-PRO 212, the A-CONs, and the S-CONs, using a technique such as shown in FIGS. 2a and 2b may be required for operations 275 to complete as rapidly as possible.

FIG. 3a illustrates a portion of a router 300. An AMB 305 and a SMB 307 of router 300 are highlighted in FIG. 3a. Recovery from a failed component (specifically, an Open Shortest Path First (OSPF) and Routing Table Manager (RTM) in router 300 are shown) and a technique for data synchronization between AMB 305 and SMB 307 are shown in FIG. 3a.

In AMB 305, there may be an active OSPF (A-OSPF) 310 executing, while in SMB 307, a standby OSPF (S-OSPF) 312 may be executing. Furthermore, there may be an active RTM (A-RTM) 315 and a standby RTM (S-RTM) 317 executing in AMB 305 and SMB 307, respectively. A-OSPF 310 communicates with S-OSPF 312 and A-RTM 315, while A-RTM 315 communicates with A-OSPF 310 and S-RTM 317, and S-RTM 317 communicates with A-RTM 315.

A-OSPF 310 may be considered to be an active information source in that it is producing information (e.g., routes) for consumption by active information consumers, e.g., A-RTM 315. S-OSPF 312 may be considered to be a backup information source since it is intended to be a replacement for A-OSPF 310 in case A-OSPF 310 fails. Similarly, S-RTM 317 may be considered to be backup information consumers, backing up A-RTM 315 should A-RTM 315 fails.

Also illustrates in FIG. 3a is a sequence of transmissions between components of AMB 305 and SMB 307 to synchronize information (e.g., Link State Advertisements and routes). Synchronizing Link State Advertisements (LSAs) may begin with A-OSPF 310 sending an LSA to S-OSPF 312 (shown as event 1 "LSA") when A-OSPF 310 finds that there has been an LSA change. According to an embodiment, an LSA change may include a new LSA, a modification to an existing LSA, a deletion of an existing LSA, or a combination thereof.

S-OSPF 312, upon successful receipt of the LSA, may send an acknowledgement for the LSA back to A-OSPF 310 (shown as event 2 "ACK") after S-OSPF 312 further processes the LSA. Processing the LSA may include checking the LSA, decoding the LSA, storing information from the decoded LSA, and so forth. A-OSPF 310 may also send a route or a set of routes derived from the LSA change to A-RTM 315 after receiving the acknowledgement from S-OSPF 312 (shown as events 3 "ROUTE"). After receiving the route from A-OSPF 310 and processing the route, A-RTM 315 may send a route to S-RTM 317 (shown as event 4 "ROUTE"). S-RTM 317, after receiving the route from A-RTM 315 and processing the route, may send an acknowledgment for the route to A-RTM 315 (shown as event 5 "ACK").

Upon receipt of an acknowledgement from S-RTM 317, A-RTM 315 may send an acknowledgement for the route from A-OSPF 310 back to A-OSPF 310 (shown as event 6 "ACK"). After receiving acknowledgements for the route or the set of the routes from A-RTM 315, A-OSPF 310 may send an LSA commit to S-OSPF 312 (shown as event 7 "COMMIT"). According to an embodiment, the LSA commit may be an indication to S-OSPF 312 that the route or the set of routes derived from the LSA is stored into S-RTM. This may be represented by setting a state flag (called "Stored in S-RTM") for the LSA. S-OSPF 312 may then send a commit acknowledgement to A-OSPF 310 after it processes the LSA commit (shown as event 8 "COM-ACK").

For each LSA (or discrete unit of information), there are flags to indicate LSA states in S-OSPF 312. One state of the LSA may be "Received from A-OSPF" indicating that S-OSPF 312 receives the LSA from A-OSPF 310. S-OSPF 312 sets the flag "Received from A-OSPF" for an LSA after it receives the LSA from A-OSPF 310. Another state of the LSA may be "Stored in S-RTM" indicating that S-RTM 317 received and stored the route or the set of routes derived from the LSA. S-OSPF 312 sets the flag "Stored in S-RTM" for an LSA and resets the flag "Received from A-OSPF" after it receives the commit for the LSA from A-OSPF 310.

FIG. 3b illustrates a flow diagram of A-OSPF operations 350 in LSA and route synchronization. A-OSPF operations 350 may be indicative of operations occurring in an A-OSPF, such as A-OSPF 310, as the A-OSPF synchronizes LSAs with S-OSPF and routes with A-RTM when the A-OSPF detects an LSA change. A-OSPF operations 350 shown in FIG. 3b may be a summary of events shown in FIG. 3a from the A-OSPF's perspective and with acknowledgements not shown.

A-OSPF operations 350 may begin with the A-OSPF detecting an LSA change and, as a result of the detected LSA change, updating the S-OSPF (block 355). In addition to updating the S-OSPF, the A-OSPF may also update the A-RTM (block 357). After updating both the S-OSPF and the A-RTM, the A-OSPF may commit the LSA change with the S-OSPF (block 359). A-OSPF operations 350 may then terminate.

FIG. 3c illustrates a flow diagram of operations 375 in switching out a failed component with a new component and bringing the new component into service. Operations 375 may be indicative of operations occurring in a control, such as control 163, of a router when the router detects a failed component and uses component switching to replace the failed component with a new component.

Operations 375 may begin with the router detecting a failure (block 380). As discussed previously, detecting an occurrence of a failure may be performed using a variety of techniques and will not be discussed herein. After detecting a failed component or failed components, the failed component may be switched out with new components (block 382). As discussed previously, component switching may occur at different granularities and the components being switched out may depend on the granularity of the component switching. For example, if an A-OSPF fails, the failed A-OSPF may be replaced with an S-OSPF or an entire board containing the failed A-OSPF, i.e., an AMB, may be replaced with a SMB. Similarly, if an A-RTM fails, the failed A-RTM may be replaced by an S-RTM, a board containing the failed A-RTM may be replaced, or so on.

For discussion purposes, consider three exemplary cases: 1) AMB 305 is detected to have failed, then AMB 305 may be replaced by SMB 307, with A-OSPF 310 and A-RTM 315 of AMB 305 being replaced by S-OSPF 312 and S-RTM 317 of SMB 307. S-OSPF 312 and S-RTM 317 of SMB 307 now become A-OSPF and A-RTM, respectively. 2) A-OSPF 310 is detected to have failed, then A-OSPF 310 may be replaced by S-OSPF 312, with S-OSPF 312 becoming an A-OSPF. 3) A-RTM 315 is detected to have failed, then A-RTM 315 may be replaced by S-RTM 317, with S-RTM 317 becoming A-RTM.

After the failed component(s) have been switched with new component(s) (block 382), the A-OSPF (either an original A-OSPF or a new A-OSPF) may send all routes derived by the LSAs having state "Received from A-OSPF" stored in the A-OSPF's memory, cache, tables, and so forth, to the A-RTM (block 384). Since the number of LSAs having state "Received from A-OSPF" is typically small, sending the routes derived from the LSAs to the A-RTM by the A-OSPF may be performed very quickly.

If the failed component(s) is A-RTM 315, then information synchronization may proceed as normal (e.g., as described in FIGS. 3a and 3b). The synchronization completes (block 386), the router may resume normal operations and operations 375 may then terminate.

Although not shown, information synchronization of A-OSPF 310, S-OSPF 312, A-RTM 315, and S-RTM 317, using a technique such as shown in FIGS. 3a and 3b may be required for operations 375 to complete as rapidly as possible.

FIG. 4a illustrates a portion of a router 400. An AMB 405 and a SMB 407 of router 400 are highlighted in FIG. 4a. Recovery from a failed component (specifically, Routing Table Manager (RTM) and Forwarding Table Manager (FTM) in router 400 are shown) and a technique for data synchronization between AMB 405 and SMB 407 are shown in FIG. 4a.

In AMB 405, there may be an active RTM (A-RTM) 410 executing, while in SMB 407, a standby RTM (S-RTM) 412 may be executing. Furthermore, there may be an active FTM (A-FTM) 415 and a standby FTM (S-FTM) 417 executing in AMB 405 and SMB 407, respectively. A-RTM 410 communicates with S-RTM 412 and A-FTM 415, while A-FTM 415 communicates with A-RTM 410 and S-FTM 417, and S-FTM 417 communicates with A-FTM 415.

A-RTM 410 may be considered to be an active information source in that it is producing information (e.g., routes) for consumption by active information consumers, e.g., A-FTM 415. S-RTM 412 may be considered to be a backup information source since it is intended to be a replacement for A-RTM 410 in case A-RTM 410 fails. Similarly, S-FTM 417 may be considered to be backup information consumers, backing up A-FTM 415 should A-FTM 415 fails.

Also illustrates in FIG. 4a is a sequence of transmissions between components of AMB 405 and SMB 407 to synchronize information (e.g., routes). Synchronizing routes may begin with A-RTM 410 sending a route to S-RTM 412 (shown as event 1 "ROUTE") when A-RTM 410 finds that there has been a route change. According to an embodiment, a route change may include a new route, a modification to an existing route, a deletion of an existing route, or a combination thereof.

S-RTM 412, upon successful receipt of the route, may send an acknowledgement for the route back to A-RTM 410 (shown as event 2 "ACK") after S-RTM 412 further processes the route. Processing the route may include checking the route, decoding the route, storing information from the decoded route, and so forth. A-RTM 410 may also send a route to A-FTM 415 after receiving the acknowledgement from S-RTM 412 (shown as events 3 "ROUTE"). After receiving the route from A-RTM 410 and processing the route, A-FTM 415 may send a route to S-FTM 417 (shown as event 4 "ROUTE"). S-FTM 417, after receiving the route from A-FTM 415 and processing the route, may send an acknowledgment for the route to A-FTM 415 (shown as event 5 "ACK").

Upon receipt of an acknowledgement from S-FTM 417, A-FTM 415 may send an acknowledgement for the route from A-RTM 410 back to A-RTM 410 (shown as event 6 "ACK"). After receiving acknowledgements from A-FTM 415, A-RTM 410 may send a route commit to S-RTM 412 (shown as event 7 "COMMIT"). According to an embodiment, the route commit may be an indication to S-RTM 412 that S-FTM 417 received and stored the route. S-RTM 412 may then send a commit acknowledgement to A-RTM 410 after it processes the route commit (shown as event 8 "COM-ACK").

For each route (or discrete unit of information), there are flags to indicate route states in S-RTM 412. One state of the route may be "Received from A-RTM" indicating that S-RTM 412 receives the route from A-RTM 410. Another state of the route may be "Stored in S-FTM" indicating that S-FTM 417 received and stored the route.

FIG. 4b illustrates a flow diagram of A-RTM operations 450 in route synchronization. A-RTM operations 450 may be indicative of operations occurring in an A-RTM, such as A-RTM 410, as the A-RTM synchronizes routes with S-RTM, A-FTM, and S-FTM when the A-RTM detects a route change. A-RTM operations 450 shown in FIG. 4b may be a summary of events shown in FIG. 4a from the A-RTM's perspective and acknowledgements not shown.

A-RTM operations 450 may begin with the A-RTM detecting a route change and, as a result of the detected route change, updating the S-RTM (block 455). In addition to updating the S-RTM, the A-RTM may also update the A-FTM (block 457). After updating both the S-RTM and the A-FTM, the A-RTM may commit the route change with the S-RTM (block 459). A-RTM operations 450 may then terminate.

FIG. 4c illustrates a flow diagram of operations 475 in switching out a failed component with a new component and bringing the new component into service. Operations 475 may be indicative of operations occurring in a control, such as control 163, of a router when the router detects a failed component and uses component switching to replace the failed component with a new component.

Operations 475 may begin with the router detecting a failure (block 480). As discussed previously, detecting an occurrence of a failure may be performed using a variety of techniques and will not be discussed herein. After detecting a failed component or failed components, the failed component may be switched out with new components (block 482). As discussed previously, component switching may occur at different granularities and the components being switched out may depend on the granularity of the component switching. For example, if an A-RTM fails, the failed A-RTM may be replaced with an S-RTM or an entire board containing the failed A-RTM, i.e., an AMB, may be replaced with a SMB. Similarly, if an A-FTM fails, the failed A-FTM may be replaced by an S-FTM, a board containing the failed A-FTM may be replaced, or so on.

For discussion purposes, consider three exemplary cases: 1) AMB 405 is detected to have failed, then AMB 405 may be replaced by SMB 407, with A-RTM 410 and A-FTM 415 of AMB 405 being replaced by S-RTM 412 and S-FTM 417 of SMB 407. S-RTM 412 and S-FTM 417 of SMB 407 now become A-RTM and A-FTM, respectively. 2) A-RTM 410 is detected to have failed, then A-RTM 410 may be replaced by S-RTM 412, with S-RTM 412 becoming an A-RTM. 3) A-FTM 415 is detected to have failed, then A-FTM 415 may be replaced by S-FTM 417, with S-FTM F17 becoming A-FTM.

After the failed component(s) have been switched with new component(s) (block 482), the A-RTM (either an original A-RTM or a new A-RTM) may send all routes having state "Received from A-RTM" stored in the A-RTM's memory, cache, tables, and so forth, to the A-FTM (block 484). Since the number of routes having state "Received from A-RTM" is typically small, sending the routes to the A-FTM may be performed very quickly.

If the failed component(s) is A-FTM 415, then information synchronization may proceed as normal (e.g., as described in FIGS. 4a and 4b). The synchronization completes (block 486), the router may resume normal operations and operations 475 may then terminate.

Although not shown, information synchronization of A-RTM 410, S-RTM 412, A-FTM 415, and S-FTM 417, using a technique such as shown in FIGS. 4a and 4b may be required for operations 475 to complete as rapidly as possible.

FIG. 5a illustrates a portion of a router 500. An AMB 505 and a SMB 507 of router 500 are highlighted in FIG. 5a. Recovery from a failed component and a technique for data synchronization between AMB 505 and SMB 507 are shown in FIG. 5a.

In AMB 505, there may be an active producer (A-PRO) 510 executing, while in SMB 507, a standby producer (S-PRO) 512 may be executing. Furthermore, there may be multiple active consumers (A-CON), such as A-CON-1 515 and A-CON-N 517, executing in AMB 505. However, there are no standby consumers in SMB 507. A-PRO 510 may communicate with S-PRO 512 as well as the A-CONs, while each A-CON may communicate with A-PRO 510. For example, A-CON-1 515 may communicate with A-PRO 510. S-PRO 512 may communicate with A-PRO 510.

A-PRO 510 may be considered to be an active information source in that it is producing information for consumption by active information consumers, e.g., the A-CONs. S-PRO 512 may be considered to be a backup information source since it is intended to be a replacement for A-PRO 510 in case A-PRO 510 fails.

Also illustrated in FIG. 5a is a sequence of transmissions between components of AMB 505 and SMB 507 to synchronize information. Synchronizing information may begin with A-PRO 510 sending an update to S-PRO 512 (shown as event 1 "UPDATE") when A-PRO 510 finds that there has been an information change. According to an embodiment, an information change may include a new piece of information, a modification to an existing piece of information, a deletion to an existing piece of information, or a combination thereof.

S-PRO 512, upon successful receipt of the update, may send an acknowledgement for the update back to A-PRO 510 (shown as event 2 "ACK") after S-PRO 512 further processes the update. Processing the update may include checking the update, decoding the update, storing information from the decoded update, and so forth. A-PRO 510 may also send an update-d derived from the information change to the A-CONs, such as A-CON-1 515 and A-CON-N 517, after receiving the acknowledgement from S-PRO 512 (shown as events 3-1 "UPDATE-D" and 3-N "UPDATE-D"). According to an embodiment, the update-d that is derived from the information change may contain the information change in one case and may contain the information that is generated by the information change and existing information in another case. According to another embodiment, A-PRO 510 may either send the update-d to the A-CONs concurrently or sequentially.

For each update (or discrete unit of information), there are flags to indicate update states in S-PRO 512. One state of the update may be "Received from A-PRO" indicating that S-PRO 512 receives the update from A-PRO 510. The flag for the state "Received from A-PRO" for the update is set after S-PRO 512 receives and processes the update from A-PRO 510. Another state of the update may be "Stored in CON" indicating that the A-CONs have received and stored the update-d derived from the information change contained in the update.

After receiving the update-d from A-PRO 510 and processing the update-d, each A-CON may send an acknowledgement for the update-d from A-PRO 510 back to A-PRO 510 (shown as events 4-1 "ACK" and 4-N "ACK"). After receiving acknowledgements from all of its A-CONs, A-PRO 510 may send an update commit to S-PRO 512 (shown as event 5 "COMMIT"). According to an embodiment, the update commit may be an indication to S-PRO 512 that the A-CONs have received and stored the update-d derived from the information change contained in the update. S-PRO 512 may then send a commit acknowledgement to A-PRO 510 after it receives and processes the update commit including setting the flag for the state "Stored in CON" for the update (shown as event 6 "COM-ACK").

FIG. 5b illustrates a flow diagram of A-PRO operations 550 in information synchronization. A-PRO operations 550 may be indicative of operations occurring in an A-PRO, such as A-PRO 510, as the A-PRO synchronizes information with S-PROs and A-CONs when the A-PRO detects an information change. A-PRO operations 550 shown in FIG. 5b may be a summary of events shown in FIG. 5a from the A-PRO's perspective and acknowledgements not shown.

A-PRO operations 550 may begin with the A-PRO detecting an information change and, as a result of the detected information change, updating the S-PRO (block 555). In addition to updating the S-PRO, the A-PRO may also update the A-CONs (block 557). After updating both the S-PRO and the A-CONs, the A-PRO may commit the information change with the S-PRO (block 559). A-PRO operations 550 may then terminate.

FIG. 5c illustrates a flow diagram of operations 575 in switching out a failed component with a new component and bringing the new component into service. Operations 575 may be indicative of operations occurring in a control, such as control 163, of a router when the router detects a failed component and uses component switching to replace the failed component with a new component.

Operations 575 may begin with the router detecting a failure (block 580). As discussed previously, detecting an occurrence of a failure may be performed using a variety of techniques and will not be discussed herein. After detecting a failed component or failed components, the failed component may be switched out with new components (block 582). As discussed previously, component switching may occur at different granularities and the components being switched out may depend on the granularity of the component switching. For example, if an A-PRO fails, the failed A-PRO may be replaced with an S-PRO or an entire board containing the failed A-PRO, i.e., an AMB, may be replaced with a SMB.

For discussion purposes, consider several exemplary cases: 1) AMB 505 is detected to have failed, then SMB 507 may replace AMB 505. However, since SMB 507 does not include S-CONs, the A-CONs in AMB 505 remain in use. 2) A-PRO 510 is detected to have failed, then A-PRO 510 may be replaced by S-PRO 512, with S-PRO 512 becoming an A-PRO.

After the failed component(s) have been switched with new component(s) (block 582), the A-PRO (either an original A-PRO or a new A-PRO) may send all updates having state "Received from A-PRO" stored in the A-PRO's memory, cache, tables, and so forth, to the A-CONs (block 584). Since the amount of data having state "Received from A-PRO" is typically small, sending the data to the A-CONs may be performed very quickly.

Although not shown, information synchronization of A-PRO 510, S-PRO 512, and the A-CONs, using a technique such as shown in FIGS. 5a and 5b may be required for operations 575 to complete as rapidly as possible.

FIG. 6a illustrates a portion of a router 600. An AMB 605 and a SMB 607 of router 600 are highlighted in FIG. 6a. Recovery from a failed component (specifically, a Forwarding Table Manager (FTM) and multiple Line Cards (LCs) in router 600 are shown) and a technique for data synchronization between AMB 605 and SMB 607 are shown in FIG. 6a.

In AMB 605, there may be an active FTM (A-FTM) 610 executing, while in SMB 607, a standby FTM (S-FTM) 612 may be executing. Furthermore, there may be multiple active LCs (A-LC), such as A-LC-1 615 and A-LC-N 617. However, there are no standby LCs. A-FTM 610 may communicate with S-FTM 612 as well as the A-LCs, while each A-LC may communicate with A-FTM 610. For example, A-LC-1 615 may communicate with A-FTM 610. S-FTM 612 may communicate with A-FTM 610.

A-FTM 610 may be considered to be an active information source in that it is producing information (e.g., routes) for consumption by active information consumers, e.g., the A-LCs. S-FTM 612 may be considered to be a backup information source since it is intended to be a replacement for A-FTM 610 in case A-FTM 610 fails.

Also illustrated in FIG. 6a may be a sequence of transmissions between components of AMB 605 and SMB 607 to synchronize information (e.g., routes). Synchronizing routes may begin with A-FTM 610 sending a route to S-FTM 612 (shown as event 1 "ROUTE") when A-FTM 610 finds that there has been a route change. According to an embodiment, a route change may include a new route, a modification to an existing route, a deletion of an existing route, or a combination thereof.

S-FTM 612, upon successful receipt of the route, may send an acknowledgement for the route back to A-FTM 610 (shown as event 2 "ACK") after S-FTM 612 further processes the route. Processing the route may include checking the route, decoding the route, storing information from the decoded route, and so forth. A-FTM 610 may also send a route to the A-LCs, such as A-LC-1 615 and A-LC-N 617, after receiving the acknowledgement from S-FTM 612 (shown as events 3-1 "ROUTE" and 3-N "ROUTE"). According to an embodiment, A-FTM 610 may either send the routes to the A-LCs concurrently or sequentially.

For each route (or discrete unit of information), there are flags to indicate route states in S-FTM 612. One state of the route may be "Received from A-FTM" indicating that S-FTM 612 receives the route from A-FTM 610. The flag for the state "Received from A-FTM" for the route is set after S-FTM 612 receives and processes the route from A-FTM 610. Another state of the route may be "Stored in LC" indicating that the A-LCs have received and stored the route.

After receiving the route from A-FTM 610 and processing the route, each A-LC may send an acknowledgement for the route from A-FTM 610 back to A-FTM 610 (shown as events 4-1 "ACK" and 4-N "ACK"). After receiving acknowledgements from all of its A-LCs, A-FTM 610 may send a route commit to S-FTM 612 (shown as event 5 "COMMIT"). According to an embodiment, the route commit may be an indication to S-FTM 612 that the A-LCs have received and stored the route. S-FTM 612 may then send a commit acknowledgement to A-FTM 610 after it receives and processes the route commit including setting the flag for the state "Stored in LC" (shown as event 6 "COM-ACK").

FIG. 6b illustrates a flow diagram of A-FTM operations 650 in route synchronization. A-FTM operations 650 may be indicative of operations occurring in an A-FTM, such as A-FTM 610, as the A-FTM synchronizes routes with S-FTMs and A-LCs when the A-FTM detects a route change. A-FTM operations 650 shown in FIG. 6b may be a summary of events shown in FIG. 6a from the A-FTM's perspective and acknowledgements not shown.

A-FTM operations 650 may begin with the A-FTM detecting a route change and, as a result of the detected route change, updating the S-FTM (block 655). In addition to updating the S-FTM, the A-FTM may also update the A-LCs (block 657). After updating both the S-FTM and the A-LCs, the A-FTM may commit the route change with the S-FTM (block 659). A-FTM operations 650 may then terminate.

FIG. 6c illustrates a flow diagram of operations 675 in switching out a failed component with a new component and bringing the new component into service. Operations 675 may be indicative of operations occurring in a control, such as control 163, of a router when the router detects a failed component and uses component switching to replace the failed component with a new component.

Operations 675 may begin with the router detecting a failure (block 680). As discussed previously, detecting an occurrence of a failure may be performed using a variety of techniques and will not be discussed herein. After detecting a failed component or failed components, the failed component may be switched out with new components (block 682). As discussed previously, component switching may occur at different granularities and the components being switched out may depend on the granularity of the component switching. For example, if an A-FTM fails, the failed A-FTM may be replaced with an S-FTM or an entire board containing the failed A-FTM, i.e., an AMB, may be replaced with a SMB.

For discussion purposes, consider several exemplary cases: 1) AMB 605 is detected to have failed, then SMB 607 may replace AMB 605. 2) A-FTM 610 is detected to have failed, then A-FTM 610 may be replaced by S-FTM 612, with S-FTM 612 becoming an A-FTM.

After the failed component(s) have been switched with new component(s) (block 682), the A-FTM (either an original A-FTM or a new A-FTM) may send all routes having state "Received from A-FTM" stored in the A-FTM's memory, cache, tables, and so forth, to the A-LCs (block 684). Since the number of routes having state "Received from A-FTM" is typically small, sending the routes to the A-LCs may be performed very quickly.

Once synchronization completes (block 686), the router may resume normal operations and operations 675 may then terminate.

Although not shown, information synchronization of A-FTM 610, S-FTM 612, and the A-LCs, using a technique such as shown in FIGS. 6a and 6b may be required for operations 675 to complete as rapidly as possible.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for synchronizing information between an active information source and a backup information source, the method comprising:
    detecting, by the active information source, a change in information;
    sending, by the active information source, a first update regarding the changed information to the backup information source;
    sending, by the active information source, a second update to each of one or more active information consumers, wherein the second update is derived from the changed information, and wherein the second update sent to each of the one or more active information consumers is derived from the changed information contained in the first update sent to the backup information source; and
    committing, by the active information source, the changed information with the backup information source.

2. The method of claim 1, further comprising receiving a first acknowledgement from the backup information source after sending the first update to the backup information source, wherein the first acknowledgement indicates that the backup information source received and stored the first update.

3. The method of claim 2, wherein the first acknowledgement is sent after the backup information source receives and processes the first update from the active information source.

4. The method of claim 1, further comprising receiving a second acknowledgement from each of the one or more active information consumers after sending the second update to each of one or more active information consumers, wherein the second acknowledgement from each of the one or more active information consumers indicates that the second update is stored in each of one or more backup information consumers.

5. The method of claim 4, wherein the second acknowledgement is sent to the active information source by an active information consumer after the active information consumer receives a third acknowledgement from the backup information source, wherein the third acknowledgement indicates the backup information consumer has stored the updated derived from the changed information.

6. The method of claim 5, wherein the backup information consumer has stored the update derived from the changed information comprises the backup information consumer checking the update, decoding the update, and storing information from the decoded update in the backup information consumer.

7. The method of claim 1, wherein committing the changed information occurs only after the active information source receives a first acknowledgement from the backup information source and a second acknowledgement from each of the one or more active information consumers.

8. The method of claim 1, wherein detecting a change in information comprises detecting new information, detecting a change in existing information, detecting a deletion of existing information, or a combination thereof.

9. The method of claim 1, wherein sending a second update to one or more active information consumers comprises concurrently sending the second update to the one or more active information consumers, sequentially sending the second update to the one or more active information consumers, or a combination thereof.

10. The method of claim 1, wherein the second update includes information identical to information in the first update or the second update includes information different from information in the first update, which is generated from the information in the first update.

11. A method for providing high availability of routing components in a routing element, the method comprising:
    synchronizing information between an active information source and a backup information source;
    detecting a failed routing component in the active information source;
    replacing the failed routing component with a backup routing component in the backup information source; and
    completing synchronization of the information,
    wherein the failed routing component is the active information source, wherein the information comprises a plurality of discrete units of information, wherein each discrete unit of information includes a respective associated flag indicating a state of the discrete unit of information, wherein completing synchronization of the information comprises sending a plurality of updates to each of one or more active information consumers with each discrete unit of information having its respective associated flag, the respective associated flag indicating that the discrete unit of information is not stored in backup information consumers, and wherein the plurality of updates are derived from the plurality of discrete units of information from a backup information source used to replace the failed routing component.

12. The method of claim 11, wherein synchronizing information comprises:
   detecting a change in information;
   sending a first update regarding the changed information to the backup information source;
   sending a second update to each of one or more active information consumers, wherein the second update is derived from the changed information contained in the first update; and
   committing the changed information with the backup information source.

13. The method of claim 11, wherein replacing the failed routing component comprises replacing a board containing the failed routing component with a board containing the backup routing component.

14. The method of claim 11, wherein the failed routing component is of a component type, wherein there is a plurality of routing components of a same component type as the failed routing component, and wherein replacing the failed routing component comprises replacing the plurality of routing components of the same component type with a plurality of backup routing components of the same component type.

15. The method of claim 11, wherein the plurality of updates that are derived from the plurality of discrete units of information from the backup information source have information identical to information in the plurality of discrete units of information or the plurality of updates that are derived from the plurality of discrete units of information from the backup information source have information different from information in the plurality of discrete units of information, and wherein the plurality of updates are generated from each discrete unit of information having its respective associated flag indicating that the discrete unit of information is not stored in the backup information consumers.

16. A router comprising:
   a receiver configured to be coupled to a data input port, the receiver configured to receive incoming information with the data input port;
   a transmitter configured to be coupled to a data output port, the transmitter configured to transmit outgoing information with the data output port;
   an active main board coupled to the transmitter and to the receiver, the active main board configured to provide routing management and to execute routing protocols to route incoming information to its intended recipient, and the active main board further configured to
   detect a change in information,
   send a first update regarding the changed information to the backup main board,
   send a second update to each of one or more active information consumers, wherein the second update is derived from the changed information, and wherein the second update sent to each of the one or more active information consumers is derived from the changed information contained in the first update sent to the backup main board, and
   commit the changed information with the backup main board;
   a standby main board coupled to the active main board, the standby main board configured to provide redundancy for the active main board in case of a failure in the active main board; and
   a controller coupled to the active main board and to the standby main board, the controller configured to detect faults in the active main board, and to switch failed components with standby components when a fault is detected.

17. The router of claim 16, wherein the controller comprises:
   a fault detect unit, the fault detect unit configured to detect failures in the active main board; and
   a component switch unit coupled to the fault detect unit, the component switch unit configured to switch a failed component in the active main board with a standby component in the standby main board.

18. The router of claim 17, wherein there is a plurality of components in the active main board of a same component type as the failed component, and wherein the component switch unit switches the plurality of components in the active main board with a plurality of standby components in the standby main board.

19. The router of claim 17, wherein the component switch unit switches the active main board with the standby main board.

* * * * *